United States Patent [19]

Starr, Sr.

[11] Patent Number: 4,796,910
[45] Date of Patent: Jan. 10, 1989

[54] AUXILIARY SUSPENSION SYSTEM FOR A MOTOR VEHICLE

[76] Inventor: Urban Starr, Sr., Upper Main St., North Troy, Vt. 05859

[21] Appl. No.: 666,828

[22] Filed: Oct. 31, 1984

[51] Int. Cl.$^4$ ............................................. B60G 11/40
[52] U.S. Cl. ..................................... 280/715; 267/30; 267/51
[58] Field of Search ................. 280/715, 716; 267/33, 267/51, 30, 21

[56] References Cited

U.S. PATENT DOCUMENTS

| | | | |
|---|---|---|---|
| 1,071,517 | 8/1913 | Grant | 267/30 |
| 1,094,814 | 4/1914 | Rinehart | 267/51 |
| 1,107,067 | 8/1914 | Hellerstedt | 267/51 |
| 1,850,259 | 3/1932 | Bugatti | 267/30 |
| 1,869,137 | 7/1932 | Flintermann | 267/30 |
| 2,110,583 | 3/1938 | Taffe | 267/21 |
| 2,167,911 | 8/1939 | Schieferstein | 267/21 |
| 2,199,896 | 5/1940 | Siebler et al. | 267/21 |
| 2,222,001 | 11/1940 | Schulze | 267/51 |
| 2,280,347 | 4/1942 | Olley et al. | 267/52 |
| 2,612,369 | 9/1952 | Mooney | 267/63 |
| 2,661,943 | 12/1953 | Wilbur | 267/2 |
| 2,715,041 | 8/1955 | Fierbaugh et al. | 296/35 |
| 2,929,618 | 3/1960 | Hutchens | 267/30 |
| 2,951,709 | 9/1960 | Ward | 280/104.5 |
| 3,089,690 | 5/1963 | Hintzen | 267/30 |
| 3,456,961 | 7/1969 | Beck | 280/715 |
| 3,528,680 | 9/1970 | Nelson | 280/124 |
| 3,606,376 | 9/1971 | Hickman | 280/124 RS |
| 3,642,302 | 2/1972 | Hickman | 280/124 |
| 3,799,571 | 3/1974 | Sudberry | 280/715 |
| 3,850,444 | 11/1974 | Wright | 280/715 |
| 3,895,819 | 7/1975 | Willetts | 280/124 R |
| 3,927,907 | 12/1975 | Bialek | 293/71 R |
| 3,970,162 | 7/1976 | Le Salver et al. | 180/64 R |
| 4,029,335 | 6/1977 | Cady et al. | 280/439 |
| 4,272,101 | 6/1981 | Chambon | 280/692 |

Primary Examiner—Richard A. Bertsch
Attorney, Agent, or Firm—Eric Y. Munson

[57] ABSTRACT

The present invention provides an auxiliary suspension system for a motor vehicle, in particular for a trailer truck, which serves to both supplement and protect the trailer springs and also to prevent the trailer from dropping directly onto the tires of the vehicle in the event that a spring breaks. A thick rubber mat is mounted to a plate on the bottom of the subframe of the trailer. The spring is positioned above U-bolts on the subframe which hold the vehicle springs. When the trailer is unloaded, the rubber mat extending from the bottom of the trailer subframe will normally be spaced several inches above the top of the U-bolt. When the vehicle is carrying a full load, the rubber mat will normally be supported on top of the U-bolt. In the event that the trailer springs break during operation of the vehicle, the rubber mat will support the trailer subframe on top of the U-bolt and prevent the subframe from dropping directly onto the tires. The vehicle will continue to be movable even with the broken springs, and can be driven to a repair facility.

12 Claims, 1 Drawing Sheet

U.S. Patent
Jan. 10, 1989
4,796,910
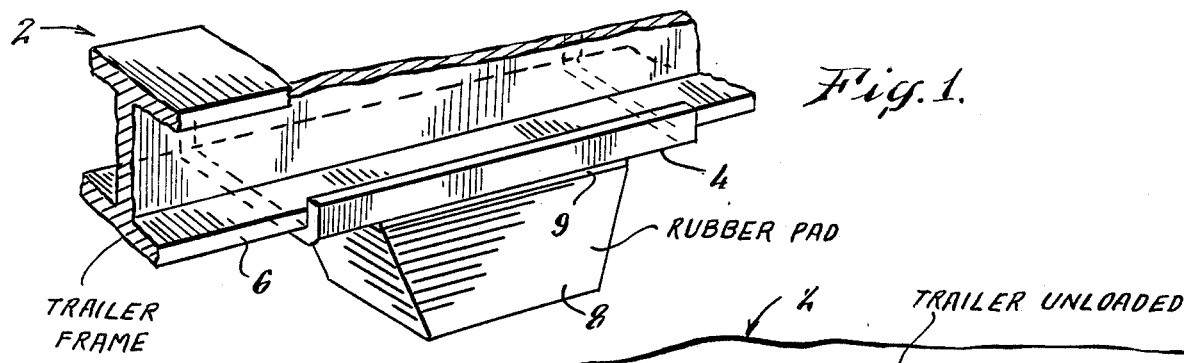
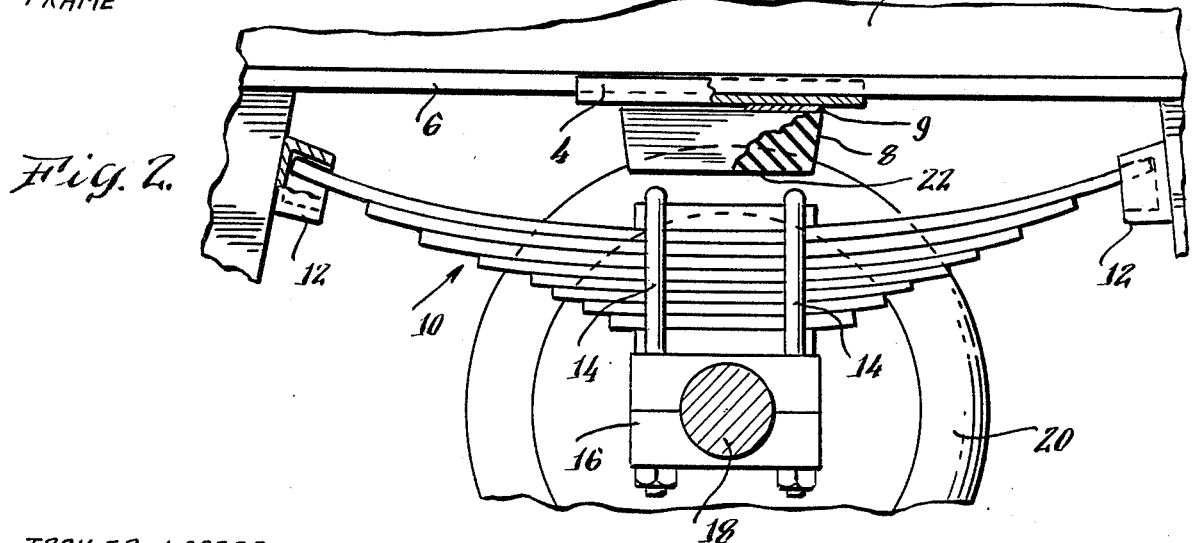
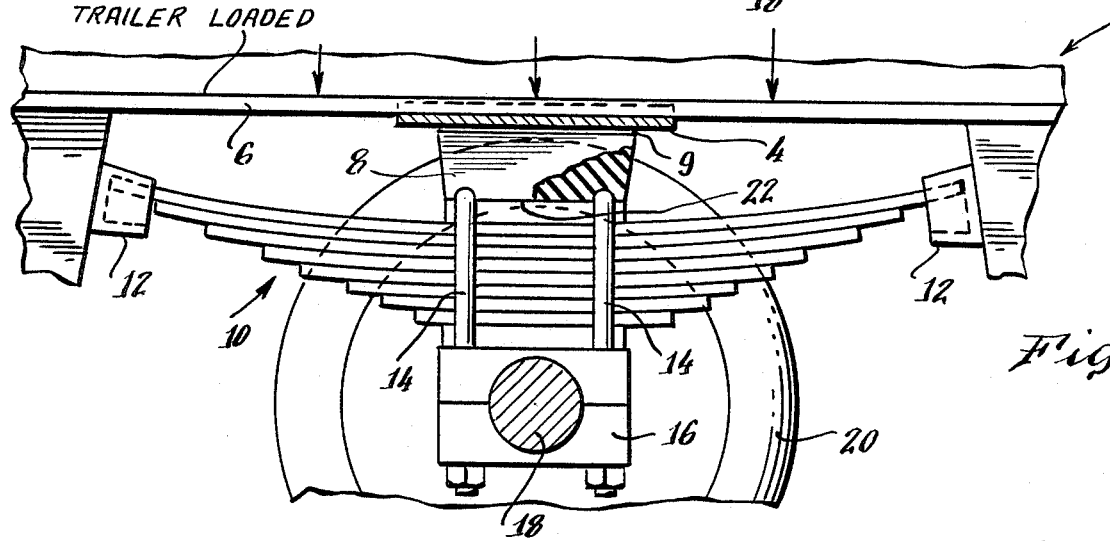
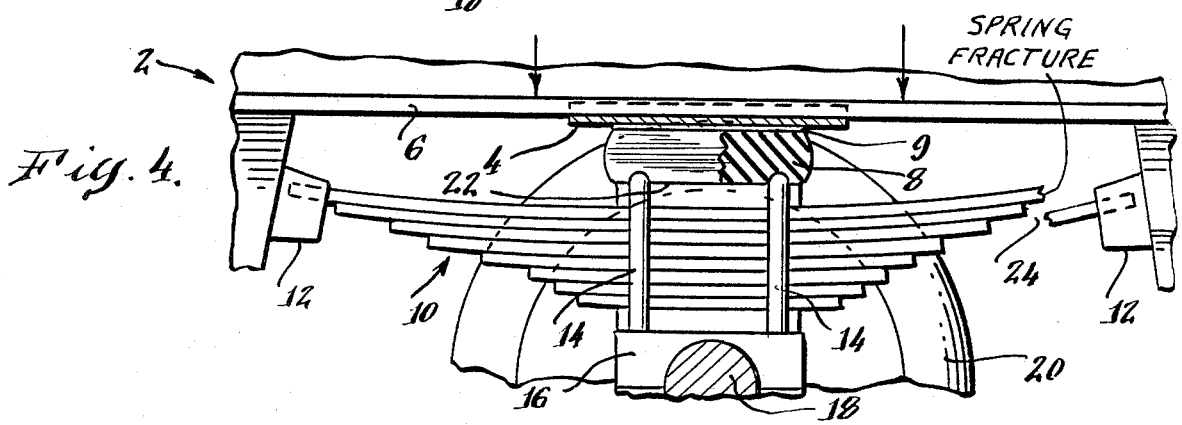

AUXILIARY SUSPENSION SYSTEM FOR A MOTOR VEHICLE

BACKGROUND OF THE INVENTION

Broken springs on a tractor trailer present a serious hazard to the drivers of such vehicles. When a spring breaks on a loaded trailer, the frame of the trailer drops directly onto the tires, requiring immediate repair. If this occurs during operation of the vehicle, it may result in an accident because the load of the trailer drops directly onto the rotating wheels and also shifts within the trailer. A broken spring on the trailer requires immediate repair. Because the load has dropped onto the tires, a broken spring usually renders the vehicle immovable.

Various arrangements of suspension known to the prior art seek to equalize the displacement of a trailer load by the use of various rubber or elastomeric materials incorporated within the suspension system. Known devices generally attempt to supplement the existing spring system of a vehicle suspension by providing elastomeric material or mats positioned at various locations within the trailer subframe for the purpose of equalizing the displacement of the load within the trailer while the trailer is being driven around curves or over bumps in the road. Other known arrangements seek to replace all springs in a trailer suspension by only various elastomeric elements or materials. Typical examples of the use of elastomeric or rubber materials in a vehicle suspension can be found in the following United States patents: U.S. Pat. No. 1,071,517; U.S. Pat. No. 1,850,259; U.S. Pat. No. 1,869,137; U.S. Pat. No. 2,110,583; U.S. Pat. No. 2,167,911; U.S. Pat. No. 2,199,896; U.S. Pat. No. 2,280,347; U.S. Pat. No. 2,612,369; U.S. Pat. No. 2,661,943; U.S. Pat. No. 2,715,041; U.S. Pat. No. 2,929,618; U.S. Pat. No. 2,951,709; U.S. Pat. No. 3,089,690; U.S. Pat. No. 3,528,680; U.S. Pat. No. 3,606,376; U.S. Pat. No. 3,642,302; U.S. Pat. No. 3,850,444; U.S. Pat. No. 3,895,819; U.S. Pat. No. 3,927,907; U.S. Pat. No. 3,970,162; U.S. Pat. No. 4,029,335; and U.S. Pat. No. 4,272,101.

It is the object of the present invention to provide a spring suspension system for a trailer which includes a resilient mat formed from elastomeric material which is positioned on the trailer subframe so as to both supplement the spring action of the trailer springs under a heavy load, and also to act as an auxiliary suspension system to prevent the trailer subframe from dropping onto the trailer tires in the event the primary supporting springs break for the purpose of maintaining the trailer in movable and drivable condition even after the trailer springs have ruptured.

SUMMARY OF THE INVENTION

The present invention provides an auxiliary suspension system for trailers which both supplements the spring action of the trailer springs under heavy load, and also acts as the sole suspension system, maintaining the trailer in drivable condition, in the event that the trailer springs break. The springs of a trailer are located in the trailer subframe and support the trailer body in an elevated position above the trailer tires during normal operation of the vehicle. The trailer springs are held in position in the subframe by at least one U-bolt mounted proximate to the inner sidewall of a trailer tire on a supporting member beneath the subframe. The U-bolt surrounds the trailer springs and holds them in a predetermined relative position with respect to the trailer axle and tire. In the preferred embodiment of the present invention, an auxiliary suspension system for a trailer subframe is provided by mounting a thick mat or pad of rubber or other elastomeric material to the bottom of the trailer subframe. The bottom of the mat or pad is elevated a predetermined distance above the top of the U-bolt holding the trailer springs when the trailer is unloaded. When the trailer is carrying no load or a light load, the bottom of the mat of rubber material will be spaced several inches directly above the U-bolt. However, when the trailer is carrying a heavy load, the weight of the load causes the trailer subframe to drop so that the bottom of the rubber mat is supported on the top of the U-bolt holding the trailer springs. In this manner, the spring suspension system of the trailer subframe is supplemented by the elastomeric material which abuts against the top of the U-bolt. In the event the trailer springs break during operation of the vehicle, the trailer subframe would normally drop onto the top of the vehicle. However, in the suspension system of the present invention, such hazard is avoided. If the trailer springs rupture during operation of the vehicle, the subframe cannot drop onto the tires because the elastomeric material mounted to the bottom of the subframe, which is supported at the top of the U-bolt holding the springs, will maintain the bottom of the subframe separated from and elevated above the top of the vehicle tires. In this event, the vehicle is maintained in a movable drivable condition with the resilient, elastomeric mat performing the entire suspension function. The vehicle may continue to be driven to a repair facility, where the broken springs may be fixed.

BRIEF DESCRIPTION OF THE DRAWINGS

FIG. 1 of the drawings is a perspective view of a supporting plate mounted to the bottom of a trailer subframe, and a mat of elastomeric material mounted to the bottom of the supporting plate;

FIG. 2 of the drawings illustrates a schematic drawing of the suspension system in accordance with the present invention when the trailer is either unloaded or carrying only a light load;

FIG. 3 of the drawings illustrates a schematic view of the suspension system of FIG. 1 when the trailer is carrying a heavy load, and FIG. 4 illustrates a schematic view of the suspension system of the present invention as it would appear if the trailer springs had broken.

DISCUSSION OF THE PREFERRED EMBODIMENTS

The suspension system of the present invention will now be discussed in detail with reference to FIGS. 1-4 of the drawings. FIG. 1 illustrates a perspective view of a trailer subframe 2 having a steel iron channel 4 mounted to the bottom surface 6 of the subframe. A rubber mat or pad 8 is molded to a steel plate 9 which itself is mounted by welding to the bottom surface of the steel iron channel 4.

FIG. 2 of the drawings illustrates a schematic diagram of the suspension system for a trailer in which the steel plate 9 and rubber mat 6 of FIG. 1 are used to provide an auxiliary suspension system for the trailer. FIG. 2 shows the position of auxiliary suspension system when the trailer is either unloaded or carrying only a light load. A plurality of trailer springs designated as reference numeral 10, are mounted to an undermount hanger and equalizer 12 in the subframe of the trailer. Two U-bolts 14, having their free ends mounted to a stationary casing 16 over the vehicle axle 18, retain the springs 10 in the position shown in FIG. 2. More specifically, the springs are retained by the U-bolts proximate to the inner surface of a tire 20 mounted to one end of the trailer's axle. The springs provide the primary suspension system for the vehicle and tend to maintain the bottom of the trailer subframe 6 elevated above the trailer tires 20 when the vehicle is being operated either in an unloaded or loaded capacity. The function, operation, and arrangement of the trailer springs, the U-bolts, and the undermount hanger and equalizer of a suspension system for a trailer subframe is conventional and well known to the prior art, and thus will be fully understood by those skilled in the art without further explanation.

As further illustrated in FIG. 2, the steel channel iron 4 is mounted to the bottom of the trailer subframe 6 directly above, but elevated from the top of the U-bolts 14. The lower surface of the steel channel iron has the steel plate 9 mounted directly thereon, preferably by welding. The rubber pad 8, which is molded into the plate 9, extends downwardly from the plate 9. In the preferred embodiment of the invention, the steel channel iron is approximately one foot long, four inches in width, and one and one half inches in thickness. The rubber pad and the steel plate are each approximately six inches in length, four and one half inches in width, and three inches thick. In the embodiment illustrated by FIG. 2 of the drawings in which the trailer is unloaded or carrying a very light load, the bottom of the rubber pad is directly above the top of the U-bolts 14 but is elevated therefrom by approximately seven inches.

Turning now to FIG. 3 of the drawings, the bottom or lower surface 22 of the rubber pad 8 is now supported directly on top of the two U-bolts 14. This position results from a fully loaded trailer in which the weight of the load causes the subframe of the trailer to drop down toward the springs and U-bolts. In this situation, both the rubber pad 8 and the trailer springs provide the suspension system for the trailer subframe. Therefore, the resiliency of the elastomeric pad 8 tends to supplement the action of the trailer springs in providing the necessary support and load displacement for the trailer subframe.

Referring now to FIG. 4, a schematic illustration of the suspension system of the present invention is shown in the event that the trailer springs 10 have broken as illustrated at reference numeral 24. Under these conditions, the rubber pad 8 performs the entire suspension system for the trailer. As in FIG. 3, the bottom surface 22 of the rubber pad is supported directly atop the arcuate portions of the U-bolts 14. However, the thickness of the insulated pad is purposely chosen so that when the subframe drops to the position in which the rubber pad is supported atop the U-bolts, the bottom surface of the subframe remains elevated above the tires 20 of the trailer. Because the subframe does not drop on the trailer tires, the vehicle remains drivable and can be driven to a repair facility to replace the broken springs. Moreover, the potential hazard of the bottom of the subframe dropping directly onto the rotating tires when the vehicle is being driven is avoided by the separation, spacing and elevation provided by the thickness of the rubber pad. The dimensions of the pad 8 are selected so that the thickness of the pad is sufficient to maintain the bottom of the trailer subframe separated from and elevated above the vehicle tires even when the bottom of the pad 8 rests directly on the top of the U-bolts 14 under the action of a full trailer load.

Thus, the rubber pad acts both as an auxiliary suspension system supplementing the action of the trailer springs, and also as the sole suspension system in the event of spring rupture. Moreover, in the latter case, the pad also acts as a spacer to prevent the serious dangers of a trailer subframe dropping on the vehicle tires when the trailer is being driven.

Many variations of the suspension system described above are possible. For example, the steel iron channel mounted to the lower surface of the trailer subframe may be bolted thereon instead of welded. Likewise, the steel plate which extends integrally from the top surface of the resilient pad 8 may be bolted to the lower surface of the steel channel. Moreover, the dimensions of the steel channel, the steel plate, and the rubber insulated pad may be varied provided that the overall thickness of these elements remains sufficient to maintain the bottom of the trailer subframe elevated from the trailer tires when the bottom of the rubber insulated pad rests upon the top of the U-bolts under the action of a full trailer load. Moreover, although the pad has been referred to as being rubber, many of the suitable resilient materials will also perform quite adequately in the suspension system of the present invention. For example, pads sold under the name "MAT INSULATED PADS" such as Upper Insulated Pad Euclid No. E-2917, Upper Insulated Pad Euclid No. E-2918, Upper Insulated Pad Euclid No. E-2919, and Lower Insulated Pad Euclid No. E-2920 may be used as the insulated pad of the presently described suspension system. The aforementioned pads are illustrated in Euclid Suspension Parts Catalog No. 808, distributed by Euclid Industries, Inc. of 6660 Bada Drive, Cleveland, Ohio 44143.

It is apparent that the suspension system described herein both augments the suspension to a trailer subframe provided by known trailer springs, and more importantly serves as a backup auxiliary suspension system in the event of failure of the trailer springs. Because the auxiliary suspension system provided by the resilient insulated pad will enable the trailer to be drivable even with broken trailer springs, the "downtime" of trailers with broken springs is markedly reduced, rendering significant economic benefits to the trailer owner. Most importantly, the auxiliary suspension system provided by the insulated pad reduces the risk of accident and injury to the driver which might otherwise result from the rupturing of the trailer springs while the vehicle is being driven.

Other modifications and variations of the new suspension system discussed will be apparent to those skilled in the art. The discussion of the preferred embodiment of the invention herein has been intended to be illustrative only, and not restrictive of the scope of the invention, that scope being defined by the following claims and all equivalents thereto.

What is claimed is:

1. In a suspension system for a motor vehicle including a vehicle frame mounted on rotatable wheels and spring means for resiliently supporting said frame and preventing said frame from dropping onto said wheels, the improvement comprising:
auxiliary suspension means comprising a layer of resilient material mounted to the underside of said frame and extending downwardly therefrom, said layer being mounted above said spring means and resting directly on supporting means therebelow when said vehicle is loaded such that said resilient material provides supplement support to said vehicle frame, said resilient layer being sufficiently thick to support said vehicle frame on said supporting means and separate said underside of said frame above said wheels in the event that said spring means rupture.

2. The suspension system of claim 1 further including retaining means for said spring means, said retaining means for said spring means being defined by said supporting means for said layer of resilient material.

3. The suspension system of claim 2 wherein said retaining means includes at least one U-bolt, the arcuate end of said U-bolt adapted to support said layer of resilient material in the event that said spring means rupture.

4. The suspension system of claim 1 wherein said layer of resilient material is elastomeric.

5. The suspension system of claim 1 wherein said layer of resilient material is rubber.

6. The suspension of claim 1 further including a plate mounted to the underside of said frame, said layer of resilient material being mounted to the lower surface of said plate.

7. The suspension system of claim 1 wherein said layer of resilient material is solid.

8. In a suspension system for a trailer, said trailer having at least one trailer spring mounted to a trailer subframe for resiliently supporting said trailer subframe above a plurality of rotatable wheels, and at least one U-bolt for retaining said trailer spring below said trailer subframe, the arcuate en of said U-bolt being oriented in an upward direction, the improvement comprising:

auxiliary suspension means including a layer of resilient material mounted on the lower surface of said subframe directly above the arcuate end of said U-bolt, said spring and said resilient layer being selected to cooperate with each other such that said resilient layer rests directly on the arcuate end of said U-bolt when said trailer is loaded so that said layer provides supplemental support to said trailer subframe, said resilient layer of material being of sufficient thickness to support said subframe and to prevent said subframe from dropping on said wheels when said layer of resilient material is supported directly on top of said arcuate end of said U-bolt in the event that said trailer spring ruptures.

9. The suspension system of claim 8 wherein said layer of resilient material is solid.

10. The suspension system of claim 8 further including means for fixedly mounting said U-bolt beneath said subframe of said trailer.

11. The suspension system of claim 10 wherein said means for mounting said U-bolt comprises a stationary element mounted to the underside of said trailer subframe.

12. The suspension system of claim 11 wherein said U-bolt is mounted proximate to the inner surface of at least one wheel.

* * * * *